(No Model.)
W. I. LUDLOW.
METHOD OF WORKING AND FORMING SECONDARY BATTERIES.
No. 362,639.　　　　　　　　　Patented May 10, 1887.
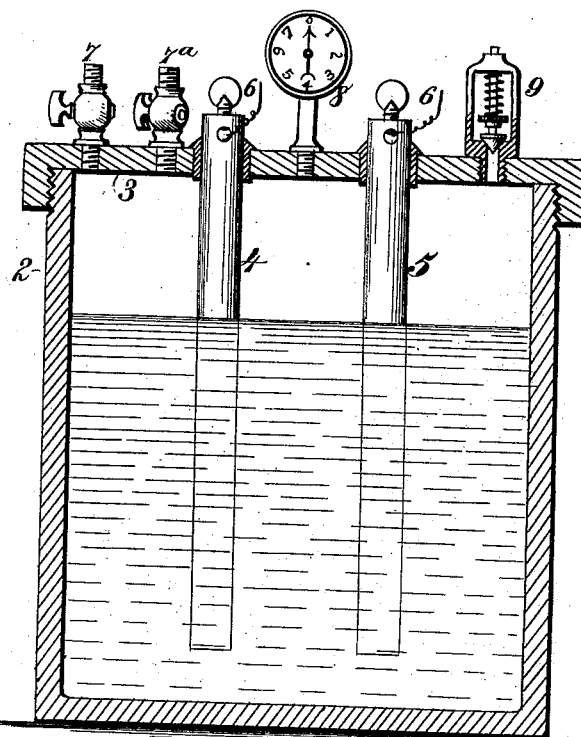
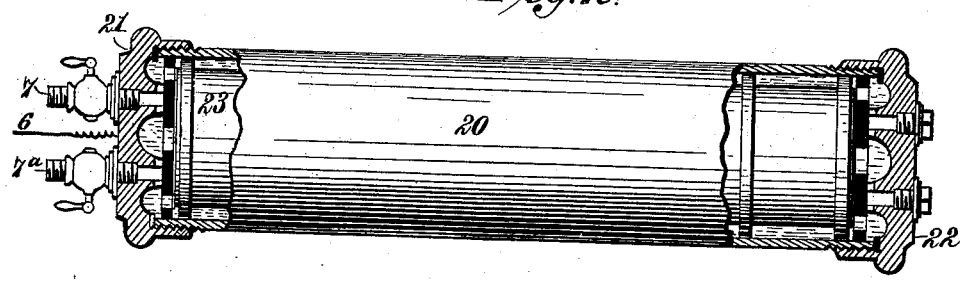

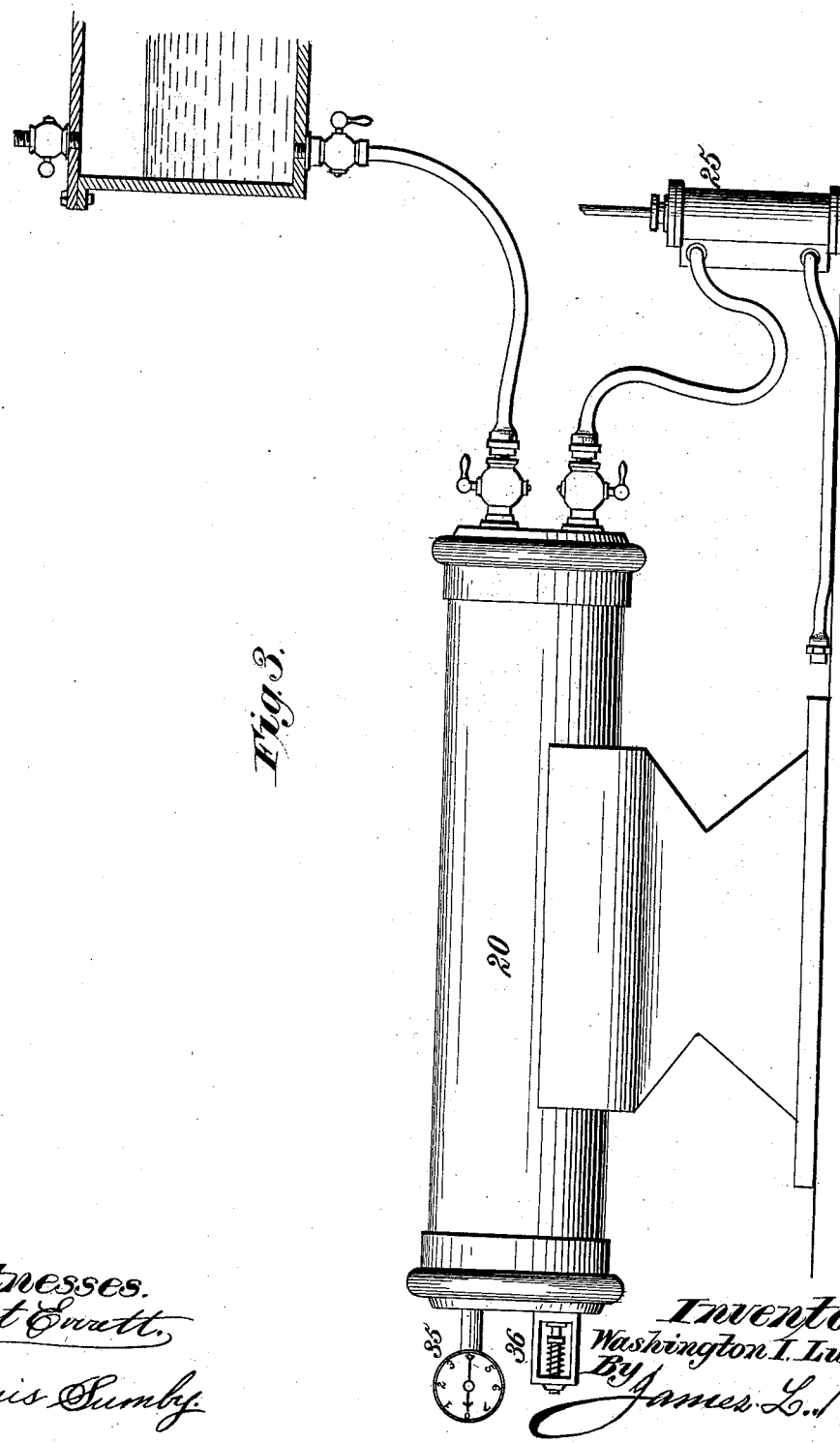

UNITED STATES PATENT OFFICE.

WASHINGTON I. LUDLOW, OF CLEVELAND, OHIO.

METHOD OF WORKING AND FORMING SECONDARY BATTERIES.

SPECIFICATION forming part of Letters Patent No. 362,639, dated May 10, 1887.

Application filed November 13, 1886. Serial No. 218,802. (No model.)

*To all whom it may concern:*

Be it known that I, WASHINGTON I. LUDLOW, a citizen of the United States, residing at Cleveland, in the county of Cuyahoga and State of Ohio, have invented new and useful Improvements in Methods of Working Primary and Secondary Batteries and Forming Elements for Secondary Batteries, of which the following is a specification.

The present invention is applicable to primary and secondary batteries of all known classes and descriptions, and has for its object to produce a more energetic electrolytic action and increased generation of electric current in primary batteries and a quicker and more perfect "formation" of secondary batteries, a more extended active surface, and more thorough utilization of the electro-motive force of such batteries.

My invention is chiefly and peculiarly adapted to secondary batteries or accumulators; but, obviously, the principle or method involved therein, and which will be hereinafter described, is also applicable to the work of primary batteries. For the sake of conciseness and definiteness, however, the description will be confined to secondary batteries.

It is well known that in that class of secondary batteries which require the formation of the electrodes by electrolytic action considerable time is required to produce the proper coating or deposit of peroxide of lead on the negative electrode and spongy metallic lead on the positive electrode. Then again, in such batteries, and in others having the active coating applied mechanically to the negative electrode, the chemical or electrolytic action which takes place during the discharge of the battery is almost entirely on the surface of the active coating of the electrode; hence a complete exhaustion of the battery cannot take place, the action being only on the surface of the elements. In my invention, however, I provide means whereby a very large surface is presented to the electrolytic action, so that superior results are produced in the working of primary batteries and a thicker coating can be produced on the secondary-battery electrodes that are "formed," and a perfect penetration of the active coating of secondary-battery elements is secured, thereby greatly accelerating the electrolytic action, and consequently increasing the electrical generation without increase of size, weight, or surface, or other modification of the battery elements.

In carrying out my invention I cause a penetration of the electrolytic or exciting-fluid into the pores or cavities of the electrodes by placing the latter in a closed cell or jar, which can be hermetically sealed, and in which a vacuum is created for allowing the electrolyte to penetrate the body or interior of the electrodes or pneumatic or hydrostatic pressure is exerted for attaining a similar result, either separately or in connection with the vacuum. In other words, it is the aim of my invention to cause the electrolytic action not to be limited to the surface of the electrodes, but to cause it to pervade the whole interior of primary-battery elements and the active coating of secondary-battery electrodes, such result being attained either by a vacuum or pneumatic, hydraulic, or other pressure.

In the drawings, Figure 1 is a section of a simple form of battery adapted to carry out my process. Fig. 2 is a sectional view of a form of secondary battery for the same purpose. Fig. 3 shows the secondary battery connected with a liquid-reservoir and means for producing exhaustion and pressure.

I have already premised that my invention is designed to embrace batteries of every class or description, and in fact no mechanical features or details of construction are claimed in the present case; but for the purpose of showing how my method of working batteries is carried out and facilitating the description, I have made the necessary illustrations.

In Fig. 1 the reference-numeral 2 may designate a cell or jar to which is fitted a cover, 3, securely held in place and capable of excluding the external atmosphere from the interior of the cell. In other words, the latter is hermetically sealed. The plates 4 and 5, constituting the positive and negative electrodes of the battery, are seated in the cover 3 in such a way that an air-tight joint is formed at their point of entrance. The circuit-wires 6 are connected with said electrodes. The cover 3 is also equipped with tubes 7 and 7ª, having suitable valves or stop-cocks, and it has a pressure or vacuum gage, 8, and a suitable valve, preferably an automatic valve, 9. Assume that the type of battery seen in Fig. 1 is one having two lead plates which are to be used as secondary-battery elements, and are to be prepared by the process of "forming" or electrolytic action. For such purpose they are immersed in a suitable electrolyte, and then they are joined in a primary or charging circuit, whereby a coating of peroxide of lead is deposited on the plate, which serves as the negative element, and the other plate, or positive element, is reduced to a spongy metallic state on its surface. Heretofore such process of forming has required considerable time and attention, and hence accumlators or secondary batteries having the active coating mechanically applied have superseded the formed elements. I am enabled by my method to materially abridge the time required for such formation of the elements, and may accomplish the desired result in various ways, the principle involved, however, being always the forcing of the electrolyte into the pores of the electrodes, so as to transform the metal of one of the electrodes throughout nearly its entire thickness into peroxide of lead, while the other electrode is converted to the same degree into spongy or reduced lead. I attain the forcing of the electrolyte into the interior or body of the electrodes by first creating a vacuum in the chamber or cell containing the same by a suitable exhaust applied to the tube 7, and then admitting the liquid through the tube 2ª, said liquid entering the pores or cells in the electrode-plates by reason of the air having been exhausted from said pores. It is known that cavities or cells exist in apparently solid metal plates and other bodies, such cells being filled ordinarily with air, gases, &c. By creating a vacuum, however, or exhausting the air from the chamber containing the electrodes, a ready permeation of the electrolyte is effected into the molecular intervales formed in the electrodes by the exhaustion of the air or watery globules from the pores and cells of the electrodes, and consequently this will permit an ulterior deeper penetration of the electrolytic action of the primary or charging current.

The act of exhaustion of the air is generally sufficient to allow the liquid coming from the reservoir 25 to permeate the pores of the electrodes; but it is also the intention to create a subsequent pneumatic or other pressure which will tend to further force and hold the liquid in the pores of the electrodes, as also to cause a more intimate contact or union of the electrolyte or exciting-fluid with the substance or body of the electrodes while the process of formation by the primary current is taking place, or while the battery is being discharged. Forcing-pump 30, as shown in Fig. 3, or chambers for the storage of compressed air, may be resorted to for creating the pneumatic pressure, and such air-pump can also be used for producing the vacuum. Instead of the vacuum or pneumatic pressure, or the two combined, I may resort to hydraulic pressure for forcing the electrolyte into the pores and cells of the electrodes, a pump or other means being used for forcibly projecting the fluid. I have stated that a vacuum followed by pneumatic pressure upon the electrolyte is used for attaining the desired result; but I desire it to be understood that the electrolyte may first be introduced into the forming-chamber, and that thereupon pneumatic pressure may be exerted upon the surface of the exciting-fluid for forcing the latter into the electrodes. Furthermore, after the exciting-fluid is once forced into the cells of the electrodes such pressure may be discontinued, or such degree of pressure may thereafter be maintained during the process of formation of the electrodes and the discharge of the battery as is consistent with the increased electrolytic action. I may add that the electrolyte can be used in a heated state, whereby results are attained that are not always possible when the electrolyte is cold.

It is understood that the quicker formation of the elements and the production of the latter with thicker active surfaces than heretofore is due mainly to the fact that the electrolyte penetrates the pores and cells of the electrodes to a greater extent than in ordinary processes, and is held by pressure in more intimate contact with the surface and substance of the electrodes, and that consequently the electrodes occlude a greater amount of oxygen and hydrogen gases than ordinarily, or that the electrolytic action of the primary current penetrates more thoroughly the body of the electrodes.

In the above description I have stated the advantages derived by my process in the formation of secondary-battery elements. In the discharge of such a battery, or in one having the electrodes prepared mechanically, the conditions arise that the electrolyte does not penetrate the active coating to such an extent as to utilize the full efficient discharge of the battery. Furthermore, there is a slow and irregular discharge. In order to effect an energetic discharge or working of the battery and a complete permeation of the active coating of the negative electrode, I resort to a vacuum followed by pneumatic or hydraulic or other pressure in order to effect the desired result. The manner of working is the same as has been described in connection with the process of formation of the battery, the only difference being that the active coating is then the surface to be penetrated by the electrolyte. It is well known that secondary batteries of the type having cells or pockets for the active material possess the disadvantage that such material is not easily penetrated, and that the electrolytic action occurs almost entirely on the surface or just below the same, whereby by the use of any method of forcing in the electrolyte or relieving the pores and cells of the active coating of air and fluids such active coating is thus completely permeated, thus producing superior results, decreasing the resistance, and rendering the action of the battery better than heretofore.

In Fig. 2 I have shown a secondary battery of large area or capacity. It comprises a strong cylinder, 20, having detachable end heads, 21 and 22, between which is held a pile, 23, consisting of spirally-rolled leaden plates separated by layers of some non-conducting material, such as felt, flannel, &c. The end heads have means for connecting with exhaust or forcing apparatus, and have a pressure-gage and safety-valve. (Designated by 35 and 36 in Fig. 3.) A detailed description is deemed unnecessary, as the construction shown forms the subject-matter of a separate application for patent filed November 29, 1886, Serial No. 220,175.

Instead of forming the electrodes in the same chamber or cell in which the forcible penetration of the electrolyte takes place, the electrodes may be formed or prepared in a special or separate chamber by any of the processes above described, such electrodes being, subsequent to such treatment, formed into a secondary pile and used in the ordinary way.

Having thus described my invention, what I claim is—

1. In the art of working primary and secondary batteries and forming secondary batteries, the method of effecting a penetration of the electrolyte into the body of the electrodes, consisting in placing the latter in a closed chamber, creating a vacuum in the latter, and then admitting the electrolyte, substantially as described.

2. In the art of working primary and secondary batteries and forming secondary batteries, the method of effecting a penetration of the electrolyte into the body of the electrodes, consisting in placing the latter in a closed chamber also containing the electrolyte, and then applying pressure to the latter, substantially as described.

3. In the art of working primary and secondary batteries and forming secondary batteries, the method of effecting a penetration of the electrolyte into the body of the electrodes, consisting in subjecting such electrolyte to hydraulic pressure.

4. In the art of working primary and secondary batteries and forming secondary batteries, the method of effecting a penetration of the electrolyte into the body of the electrodes, consisting in placing the latter in a closed chamber, creating a vacuum in the latter, admitting the electrolyte, and then subjecting the latter to pressure, substantially as described.

5. The method of forming secondary-battery elements, consisting in first removing gases and liquids from their pores and cells by a vacuum, thereby causing a penetration of the electrolyte into said pores and cells, and then connecting the elements with a primary or charging circuit, substantially as described.

6. The process herein described of saturating the elements of a battery with an electrolyte by first exhausting the pores, cells, or intervening spaces of the same of air, gases, or other fluids by means of a vacuum, and then admitting the electrolyte under pressure, thereby forcing the same into the pores and cells, as and for the purpose set forth.

In testimony whereof I have affixed my signature in presence of two witnesses.

W. I. LUDLOW.

Witnesses:
JAMES L. NORRIS,
J. A. RUTHERFORD.